UNITED STATES PATENT OFFICE.

HENRY LITZ, OF BALTIMORE, MARYLAND.

TONIC BITTERS.

SPECIFICATION forming part of Letters Patent No. 289,673, dated December 4, 1883.

Application filed July 12, 1883. -(No specimens.)

*To all whom it may concern:*

Be it known that I, HENRY LITZ, a citizen of the United States, residing at Baltimore, Maryland, have invented certain new and useful Improvements in Bitters for the Cure of Dyspepsia, Liver-Complaint, Weak Stomach, &c., of which the following is a specification.

My bitters are prepared from the following formula: For twenty-five gallons of the bitters, take high-wines, (*Spt. rect.*,) seventeen gallons; distilled water, (*Aqua destillata*,) eleven gallons; hops, (*Humulus*,) four pounds; unripe orange, (*Poma aurantii immat.*,) sixteen ounces; zedoary-root, (*Rad. zedoariæ*,) five ounces; ginger-root, (*Rad. zingib.*,) five ounces; cardamom-seed, (*Sem. cardam.*,) two and one-half ounces; star anise-seed, (*Sem. anisi stellati*,) two and one-half ounces; bitter orange-peel, (*Cort. aurantii am.*,) two and one-half ounces; gentian-root, (*Rad. Gentianæ*,) one and one-half ounce; Cape aloes, (*Aloes Cap.*,) small quantity; gum-myrrh, (*Myrrhæ*,) one and one-half ounce; anisated liquor of ammonia, (*Liq. ammon. anisati*,) sixteen ounces; tincture of nux vomica, (*Tinct. nux vomica*,) one-half ounce.

In compounding the above ingredients I take the seventeen gallons of high-wine or alcohol, eleven gallons of distilled water, four pounds of hops, sixteen ounces of whole crushed unripe orange, five ounces of zedoary-root, five ounces of ginger-root, two ounces and one-half of cardamom-seed, two ounces and one-half of star anise-seed, two ounces and one-half of bitter orange-peel, one ounce and one-half of gentian-root, a sufficient portion of Cape aloes, and one-half an ounce of myrrh, and thoroughly mix them. After allowing the mixture to stand for from one to two weeks, I strain it and add sixteen ounces of anisated liquor of ammonia and one-half an ounce of tincture of nux vomica.

The mixture thus prepared constitutes a very valuable and efficient remedy for the treatment of dyspepsia, liver-complaint, sick stomach, general debility, &c.

The above bitters is to be administered in doses of a wine-glassful, to be taken before meals, three times a day.

I claim as new and desire to secure by Letters Patent—

The bitters herein described, consisting of high-wine, distilled water, hops, unripe orange, zedoary-root, ginger-root, cardamom-seed, star anise-seed, bitter orange-peel, gentian-root, Cape aloes, myrrh, anisated liquor of ammonia, and tincture of nux vomica, in the proportions and manner substantially as described.

In witness whereof I have hereunto set my hand in presence of two witnesses.

HENRY LITZ.

Witnesses:
HARRY DEMUTH,
SHIPLEY BRASHEARS.